Aug. 17, 1954     R. C. SINGLETON     2,686,687

TUBE ASSEMBLY

Filed Aug. 8, 1951

INVENTOR.
Robert Singleton
BY
Barnes, Kisselle, Laughlin & Raisch
ATTORNEYS.

Patented Aug. 17, 1954

2,686,687

UNITED STATES PATENT OFFICE 2,686,687

TUBE ASSEMBLY

Robert C. Singleton, Oberlin, Ohio, assignor to Gregory Industries, Inc., Detroit, Mich., a corporation of Michigan Application August 8, 1951, Serial No. 240,934

1 Claim. (Cl. 287—93)

This invention relates to a tube assembly and more particularly to an arrangement for securing tubular members together.

It is an object of this invention to produce a tube assembly which lends itself to a facile and inexpensive assembly of one tube to another and yet is of very simple structure.

The invention also contemplates a tube assembly which securely fastens one tube to another but which can be readily disassembled.

Another advantage of the instant tube assembly is that although the tubes of the assembly are securely connected together nevertheless the one tube can be pivoted relative to the other.

The tube assembly, which is the subject of this invention, is particularly well adapted for use in the manufacture of tubular metal furniture.

Referring more particularly to the drawings, it will be seen that the tube assembly comprises tubular members 1 and 2. The particular cross-section or geometry of tubes 1 and 2 is unimportant. The cross section of the tubes can be irregular, circular, polygonal, or any other shape but, for purposes of illustration, tubes 1 and 2 are shown of circular cross-section.

Figures 4, 5:
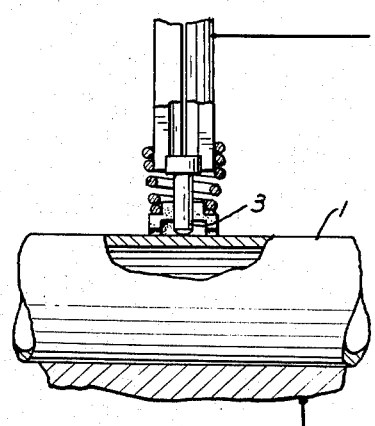
Fig. 4 is an end view looking into the end of the tube which houses the spring clip.
Fig. 5 is a view illustrating the method of arc welding the stud onto the other tubular member of the assembly.

The connection between tubes 1 and 2 essentially comprises a stud 3 and a spring clip 4. The stud 3 is electrically arc welded to the tube 1 in a known manner, for example, by electric arc stud welding, as shown in the United States patent to Nelson 2,413,189. Fig. 5 illustrates the method and apparatus for electric arc welding of the stud 3 to the tube 1, as shown and described in the said Nelson patent.

Tube 2 is provided with an aperture 5 which can be formed in the tube 1 in any suitable manner such as by drilling or punching. Opening 5 will be large enough to pass head 6 on the stud 3. Here again, the geometrical shape of opening 5 and head 6 are immaterial and, for illustrative purposes, they are shown as circular. Opening 5 has a diameter a few thousandths of an inch greater than the diameter of head 6.

Figure 1:
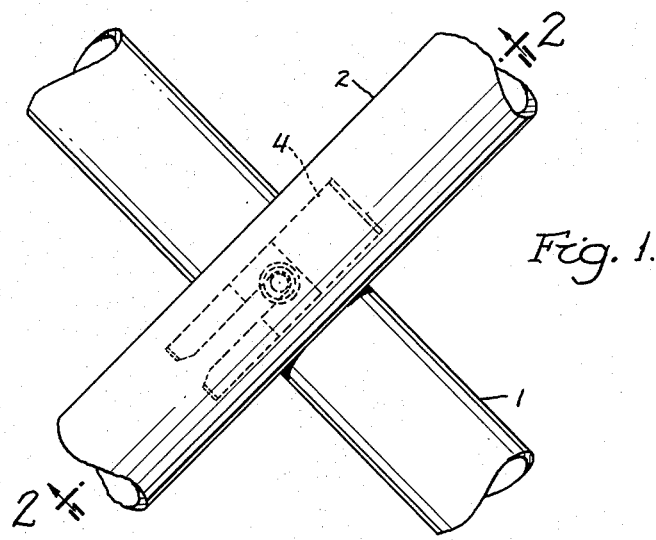
Fig. 1 is an elevation showing the tube assembly which is the subject of this invention.
Figure 2:
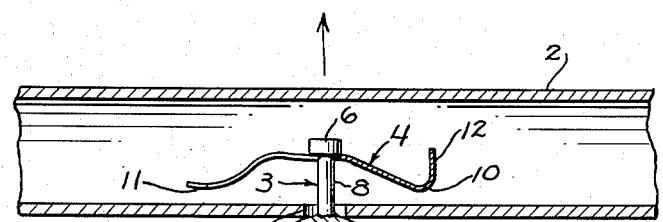
Fig. 2 is a section along the line 2—2 of Fig. 1.

After stud 3 has been welded to tube 1, the stud 3 is passed through opening 5, as shown in Fig. 2, and at this time the spring clip 4 is passed through one end of tube 2 and moved lengthwise thereof until the spring legs 7 straddle the reduced shank portion 8 of stud 3 and underlie head 6. Preferably the bight portion 9 of clip 4 abuts against shank 8.

When in final assembled position, the clip rests upon the inside wall of tube 2 at the corners 10 at the rear end of the clip and also along the bottom faces of the ends 11 of spring fingers 7. In forcing the clip 4 into final assembled position (Fig. 2) the spring clip 4 is flexed downwardly toward a flattened condition so that the spring clip 4 reacts against head 6 in the direction indicated by the arrow (Fig. 2) to thereby draw tube 1 tightly against tube 2.

Figure 3:
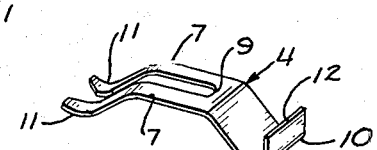
Fig. 3 is a perspective view showing the clip which is part of the assembly.

Clip 4 in its normal unstressed condition (Fig. 3) is in the form of an arch and is provided with a flange 12 at one end which is useful in assembling the clip to stud 3 and disassembling it therefrom. Pressure can be applied against flange 12 to force the same into final assembled position beneath head 6 and when it is desired to disassemble tubes 1 and 2, a hooked instrument can be hooked over flange 12 and the clip withdrawn from beneath head 6 and out of tube 2.

Since clip 4 is in tension and acts through stud 3 to draw tube 1 tightly against tube 2, the tube can be rotated about post 3 as a pivot. In rotating tube 2 relative to tube 1, stud 3 will rotate in the bight portion 9 of the clip 4 and the one tube will pivot about the other at the bearing point around the circumference of the opening 5.

Although the above described method and arrangement is highly advantageous in securing two tubular members together, it can also be used for securing two flat plates together.

I claim:

An assembly comprising, an elongated member and an elongated tube, said tube having an inside surface and an opening of predetermined size and shape between the ends thereof, a post welded to the member and extending generally transversely therefrom through the opening and terminating in an enlarged head positioned entirely within the tube and spaced from the inside surface thereof, said head having a size and shape substantially equal to that of the opening, an arched bifurcated spring slidable lengthwise in the tube and including a flange on one end thereof extending transversely of the tube to strengthen the spring and facilitate forcing the spring into assembled position, said spring having the ends thereof pressing against the inside face of the tube and having a center portion thereof straddling the post and pressing against the head, thereby fastening the members together, said spring having a contour surface cooperating with said head and an edge abutting said post to hold the spring in engagement with the post.

References Cited in the file of this patent

UNITED STATES PATENTS

| Number | Name | Date |
|---|---|---|
| 1,101,858 | Lachman | June 30, 1914 |
| 1,111,393 | Lachman | Sept. 22, 1914 |
| 1,481,396 | Ternes | Jan. 22, 1924 |
| 2,228,176 | Miller | Jan. 7, 1941 |
| 2,278,708 | Miller | Apr. 7, 1942 |
| 2,284,222 | Miller | May 26, 1942 |
| 2,433,969 | Wood | Jan. 6, 1948 |
| 2,550,811 | Herbert | May 1, 1951 |

FOREIGN PATENTS

| Number | Country | Date |
|---|---|---|
| 415,541 | Great Britain | Aug. 30, 1934 |
| 546,381 | France | Aug. 18, 1922 |
| 549,750 | Germany | Apr. 30, 1932 |